United States Patent [19]

Kishino et al.

[11] Patent Number: 5,633,650
[45] Date of Patent: May 27, 1997

[54] FLAT-TYPE FLUORESCENT DISPLAY DEVICE

[75] Inventors: Takao Kishino; Shigeo Itoh; Tatsuo Yamaura; Teruo Watanabe; Kazuyoshi Ohtsu; Masateru Taniguchi, all of Mobara, Japan

[73] Assignee: Futaba Denshi Kogyo K.K., Mobara, Japan

[21] Appl. No.: 429,468

[22] Filed: Apr. 27, 1995

Related U.S. Application Data

[63] Continuation of Ser. No. 956,086, Oct. 2, 1992, abandoned.

[30] Foreign Application Priority Data

Oct. 3, 1991 [JP] Japan ................................. 3-282009

[51] Int. Cl.$^6$ ............................................. G09G 3/22
[52] U.S. Cl. ......................... 345/74; 313/496; 313/309
[58] Field of Search .............................. 313/309, 336, 313/351, 422, 495–497, 469, 310, 311, 463; 315/366, 169.3; 345/47, 74

[56] References Cited

U.S. PATENT DOCUMENTS

| | | |
|---|---|---|
| 4,575,765 | 3/1986 | Hirt ............................. 315/169.3 |
| 4,733,139 | 3/1988 | Morimoto ......................... 313/422 |
| 5,015,912 | 5/1991 | Spind et al. ....................... 313/495 |
| 5,094,975 | 3/1992 | Siu ................................. 313/309 |
| 5,155,416 | 10/1992 | Suzuki et al. ..................... 313/422 |
| 5,189,341 | 2/1993 | Itoh et al. ........................ 313/309 |
| 5,223,766 | 6/1993 | Nakayama et al. ................. 313/495 |
| 5,256,936 | 10/1993 | Itoh et al. ....................... 313/495 |

*Primary Examiner*—Richard Hjerpe
*Assistant Examiner*—Amare Mengistu
*Attorney, Agent, or Firm*—Oblon, Spivak, McClelland, Maier & Neustadt, P.C.

[57] ABSTRACT

A flat-type fluorescent display device permitting luminous display to be observed through only a front glass cover while substantially increasing luminance. A front glass cover is provided on an inner surface thereof with FECs constituted by cathode lines, insulating layers, emitters and gate lines so as to define light-permeable sections between FECs. A substrate is formed opposite to the light-permeable sections with anodes constituted by anode-lines and phosphor layers. Electrons emitted from the FECs impinge on the anodes, leading to luminescence of the phosphor layer, which is then observed through the light-permeable sections of the front glass cover.

14 Claims, 4 Drawing Sheets

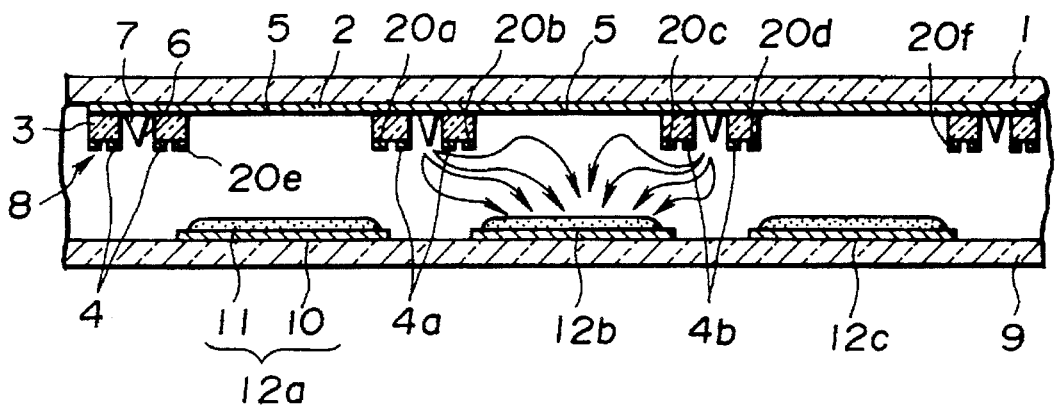
FIG. 3(a)
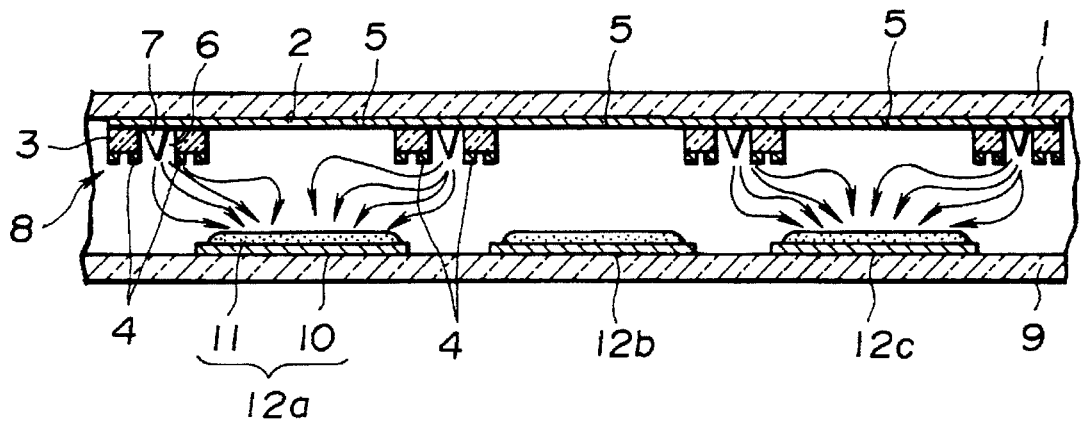
FIG. 3(b)
FIG. 4
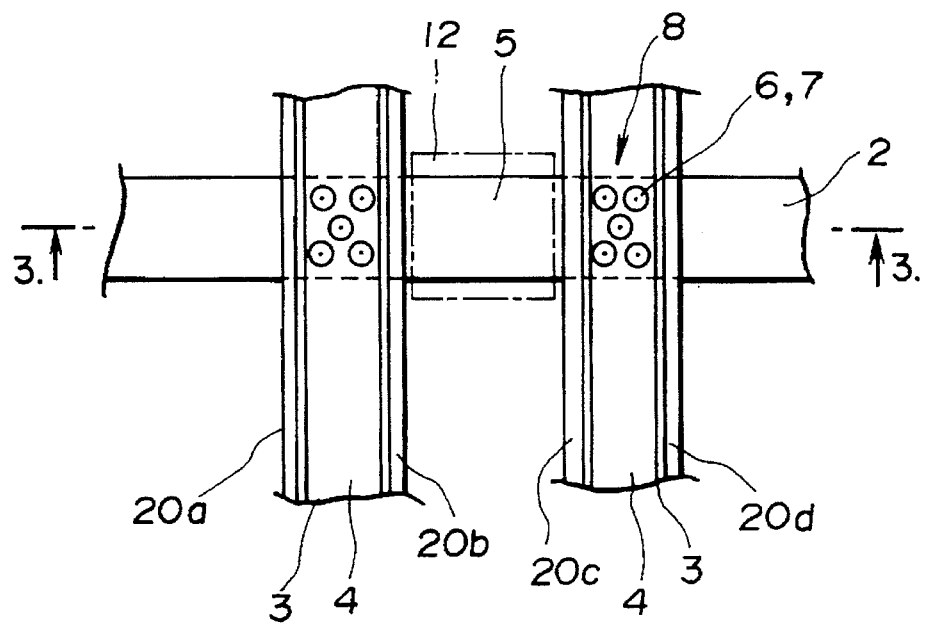

FLAT-TYPE FLUORESCENT DISPLAY DEVICE

This application is a continuation of application Ser. No. 07/956,086, filed on Oct. 2, 1992, now abandoned.

BACKGROUND OF THE INVENTION

This invention relates to a flat-type fluorescent display device incorporating field emission cathodes (hereinafter referred to as "FECs") therein as an electron source, and more particularly to a flat-type fluorescent display device which is relatively increased in size of an image plane and relatively decreased in picture cell density for display by means of the FECs.

Now, a conventional flat-type fluorescent display device incorporating FECs therein will be described with reference to FIG. 7. The conventional fluorescent display device includes a substrate 100, on which cathodes 101 are deposited. On the cathodes 101 are formed insulating layers 102 and gate electrodes 103 in turn. The insulating layers 102 and gate electrodes 103 are formed with holes 104 by photolithography and etching. The cathodes 101 each are formed on a portion thereof exposed through each of the holes 104 with an emitter 105 of a conical shape, resulting in FECs 110 being formed. The fluorescent display device also includes a transparent or light-permeable front cover 106 arranged opposite to the substrate 100. The front cover 106 is formed by deposition on an inner surface thereof with a transparent light-permeable anode conductor 107, which is formed by deposition on portions thereof opposite to the FECs with phosphor layers 108, resulting in anodes 109 which function as a luminous display section being formed.

In the conventional fluorescent display device constructed as described above, electrons discharged from the FECs 110 impinge on the anodes 109 to permit the phosphor layers 108 of the anodes to emit light, which is then observed through the anode conductor 107 and front cover 106.

Thus, it will be noted that the flat type conventional fluorescent display device using the FECs is a front emission type which is adapted to permit luminescence of the phosphor layers to be observed through the anode conductor and front cover. The reason why the front emission type fluorescent display device has been employed is that it is highly difficult to form the insulating layers 102 and emitters 105 of the FECs of a transparent or light-permeable material, so as to provide a construction which permits the luminescence to be observed through the substrate 100.

The fluorescent display device incorporating the FECs therein is generally used for graphic display. Such applications cause the number of electrode lines to be increased, wherein the electrode lines are driven while being scanned in order. Unfortunately, this causes a duty ratio of the device to be reduced, leading to a decrease in luminance.

SUMMARY OF THE INVENTION

The present invention has been made in view of the foregoing disadvantage of the prior art.

Accordingly, it is an object of the present invention to provide a flat-type fluorescent display device of the front emission type which is capable of permitting luminescence of the anodes to be observed through only a front cover while incorporating FECs therein.

It is another object of the present invention to provide a flat-type fluorescent display device which is capable of being significantly increased in luminance.

It is a further object of the present invention to provide a flat-type fluorescent display which is capable of permitting observation of luminous display of the anodes being further facilitated.

In accordance with the present invention, a flat-type fluorescent display device is provided. The flat-type fluorescent display device includes a front glass cover, field emission elements arranged on an inner surface of the front glass cover in a manner to be spaced from each other, to thereby provide light-permeable sections which permit luminous display to be observed through the front glass cover, a substrate arranged opposite to the front glass cover, and anodes including anode conductors and phosphor layers deposited on the anode conductors. The anodes are arranged in a manner to be opposite to the light-permeable sections of the front glass cover.

In the flat-type fluorescent display device of the present invention constructed as described above, electrons discharged from field emission elements formed on the front glass cover impinge on the phosphor layers of the anodes arranged on the substrate, resulting in luminescence of the phosphor layers. The luminescence is then observed through the light-permeable sections of the front glass cover.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein:

FIGS. 3A and 3B each are a sectional view taken along line B—B of FIG. 4 and showing another embodiment of a flat-type fluorescent display device according to the present invention;

FIG. 4 is a plan view showing in a front cover incorporated in the flat-type fluorescent display device shown in FIG. 3;

DETAILED DESCRIPTION OF THE PREFERRED EMBODIMENTS

Figure 1:
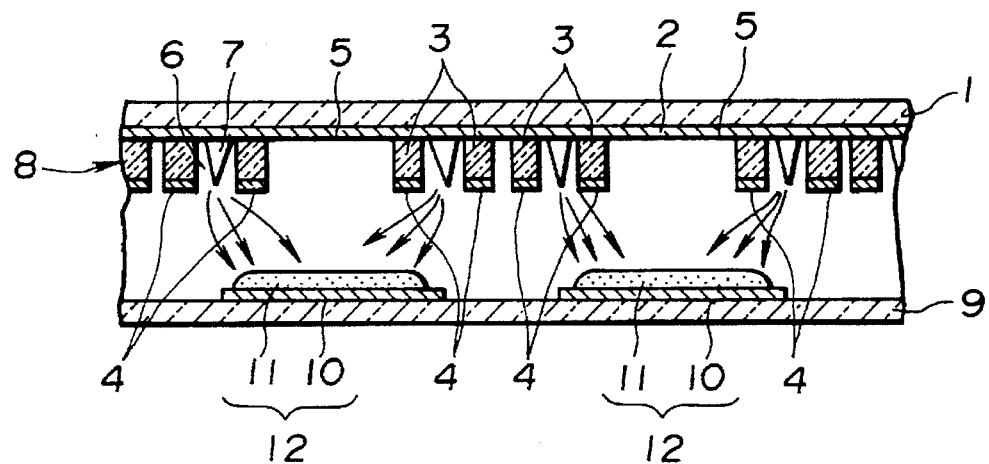
FIG. 1 is a sectional view taken along line A—A of FIG. 2 and showing an embodiment of a flat-type fluorescent display device according to the present invention.

Now, a flat-type fluorescent display device according to the present invention will be described hereinafter with reference to FIGS. 1 to 6, wherein like reference numerals designate like or corresponding parts throughout.

Figure 2:
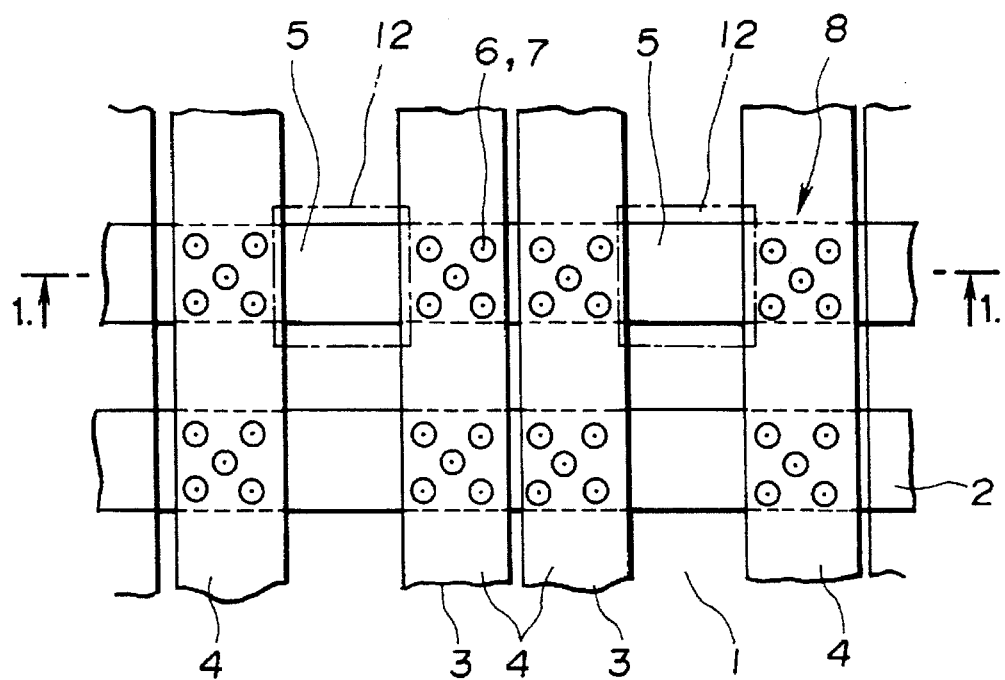
FIG. 2 is a plan view showing a front cover incorporated in the flat-type fluorescent display device shown in FIG. 1.

Referring first to FIGS. 1 and 2, an embodiment of a flat-type fluorescent display device according to the present invention is illustrated. A fluorescent display device of the illustrated embodiment includes a front glass cover 1, which is provided on an inner surface thereof with a plurality of cathode lines 2 in a manner to be spaced from each other at predetermined intervals. The cathode lines 2 are formed of a transparent conductive film of ITO (indium tin oxide) into a strip-like shape. On the cathodes 2 are arranged strip-like insulating layers 3 so as to extend in a direction perpendicular to the cathode lines 2, and then on the insulating layers 3 are arranged gate lines 4. The insulating layers 3 are so arranged that each adjacent two insulating layers 3 spaced from each other at a micro-distance constitute one set. Therefore, such arrangement is also true of the gate lines 4. The respective sets are spaced from each other at a relatively increased distance, so that light-permeable sections 5 which permit anodes described hereinafter to be observed through the front glass cover 1 may be defined between each adjacent two sets. In the illustrated embodiment, the gate lines 4 are arranged so that a whole area of the gate lines 4 accounts for less than 50% of a display area, so that the light-permeable sections 5 account for 50% of the display area or more.

The gate lines 4 and insulating layers 3 are formed at portions thereof positioned on the cathode lines 2 with a plurality of holes 6, and the gate lines 4 are provided on portions thereof exposed through the holes 6 with emitters 7 which are formed of a metal material such as Mo, Nb or the like into a conical shape. Thus, in the illustrated embodiment, FECs 8 are constituted by the cathode lines 2 and gate lines 4 arranged in a matrix manner on the inner surface of the front glass cover 1, wherein desired driving and scanning of both lines permit electrons to be emitted from the emitters 7 desired.

The flat-type fluorescent display device of the illustrated embodiment also includes a substrate 9 arranged opposite to the front glass cover 1. The substrate 9 is formed on portions thereof opposite to the strip-like or rectangular light-permeable sections 5 between the gate lines 4 with anode lines 10, which are made of aluminum and arranged so as to extend in parallel to the gate lines 4. The anode lines 10 are electrodes each functioning as both an anode conductor and a wiring conductor and are formed by deposition on portions thereof opposite to the cathode lines 2 with phosphor layers 11, resulting in anodes 12 which serve as luminous display sections being formed. In the illustrated embodiment, the phosphor layers 11 are provided in a dot-like manner so as to correspond to the FECs 8. Alternatively, the phosphor layers 11 may be arranged in a strip-like manner along the anode lines 10.

Now, the manner of operation of the flat-type fluorescent display device of the illustrated embodiment constructed as described above will be described hereinafter.

First, the anodes 10 have applied thereto a positive potential of a predetermined level from a common power supply. Then, the cathode lines 2 are successively fed with a cathode signal in a predetermined direction one by one and a display signal is fed to the gate lines 4 desired in synchronism with the cathode signal. Such feeding of the display signal to the desired gate lines 4 is carried out with respect to every two gate lines 4 with the anode 12 being interposed therebetween. This permits only the anodes 12 on the anode lines 10 interposed between the respective two gate lines 4 to which the display signal is applied and positioned opposite to the cathode lines 2 to which the cathode signal is applied to emit light. Luminescence of the anodes 12 thus obtained is observed through the light-permeable sections 5 of the front cover 1.

In the illustrated embodiment, as described above, the gate lines 4 are so arranged that each two form one set and the FECs 8 are arranged so as to be close to the anodes 12 as much as possible. Such arrangement permits a sufficient amount of electrons to satisfactorily impinge on the anodes.

Also, in the illustrated embodiment, the anode lines 10 each have applied thereto a predetermined voltage. In this connection, selection of only the anode lines 10 required in synchronism with driving of the gate lines 4 eliminates a possibility of leakage luminance of the adjacent anodes 12, therefore, the gate lines 4 are arranged one by one at predetermined intervals.

Referring now to FIGS. 3A to 4, another embodiment of a flat-type fluorescent display device according to the present invention is illustrated. A fluorescent display device of the illustrated embodiment is so constructed that gate lines 4 are arranged one by one at predetermined intervals and two deflecting electrodes 20 are provided on each of insulating layers 3 in a manner to interpose each of gate lines 4 therebetween. The deflecting electrodes 20 each are arranged so as to be electrically independent from the gate line 4 and selectively applied thereto a positive or negative potential as required. The deflecting electrodes 20 each are made of a metal thin film and may be formed of the same material as the gate lines 4 simultaneously with formation of the gate lines. The remaining part of the illustrated embodiment may be constructed in substantially the same manner as the embodiment described above.

Driving of the flat-type fluorescent display device of the illustrated embodiment is carried out in such a manner that FECs 8 to be turned on are selected by a matrix defined by cathode lines 2 and the gate lines 4 and the cathode lines 2 are selected in synchronism with application of a signal to the gate lines 4. Also, in the illustrated embodiment, the gate lines 4 are arranged one by one unlike in the embodiment shown in FIGS. 1 and 2; so that light-permeable sections 5 are formed into an increased width, while a distance of each of the FECs 8 and anodes 5 is somewhat increased. For this reason, the deflecting electrodes 20 are driven in synchronism with the above-described driving, so that electrons discharged may be directed to the anodes 12 while deflecting the electrons.

More specifically, at a first timing shown in FIG. 3A, anodes 12a and 12c have applied thereto a negative anode voltage and a positive anode voltage to cause an anode 12b to emit light, respectively. Also, gate lines 4a and 4b positioned so as to interpose the selected anode 12b therebetween and a cathode line 2 positioned opposite to the selected anode 12b have applied thereto a voltage. Of four such deflecting electrodes 20 in all adjacent to the gate lines 4a and 4b, the outer two deflecting electrodes 20a and 20d have applied thereto a negative deflection voltage and inner two deflecting electrodes 20b and 20c are applied thereto a positive deflection voltage. This causes electrons emitted from emitters 7 of FECs 8 to be deflected toward the deflecting electrodes 20b and 20c to which a positive potential is applied, to thereby impinge on the anode 12b positioned between the gate lines 4a and 4b.

At a second timing shown in FIG. 3B, the anodes 12a and 12c are selected and application of a voltage to the deflecting electrodes 20 is carried out in a manner opposite to that in the first timing. This causes electrons emitted from the FECs 8 to be deflected toward the anodes 12a and 12d, resulting in impinging thereon. Luminous display thus obtained from the anodes 12 is observed through the light-permeable sections 5.

Figure 5:
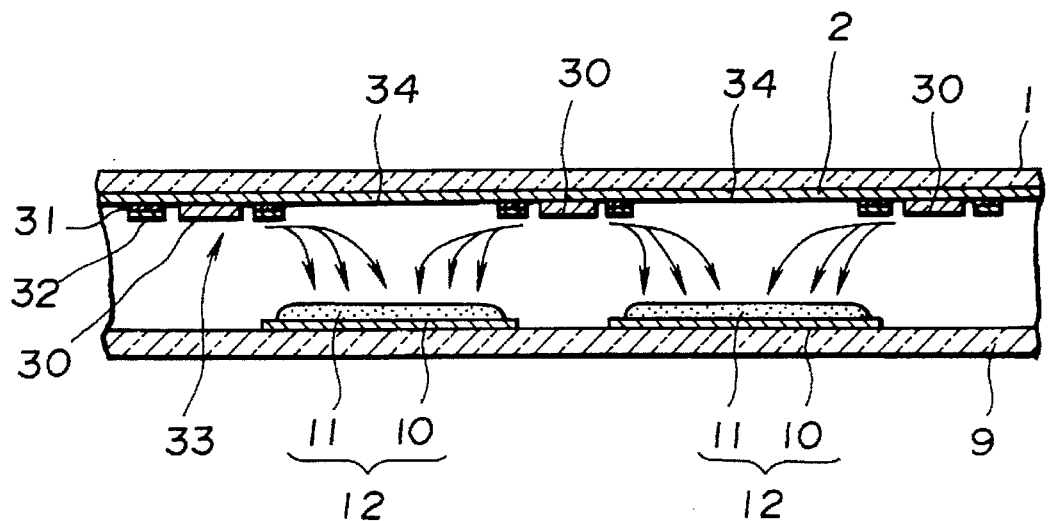
FIG. 5 is a sectional view taken along line C—C of FIG. 6 and showing a further embodiment of a flat-type fluorescent display device according to the present invention.
Figure 6:
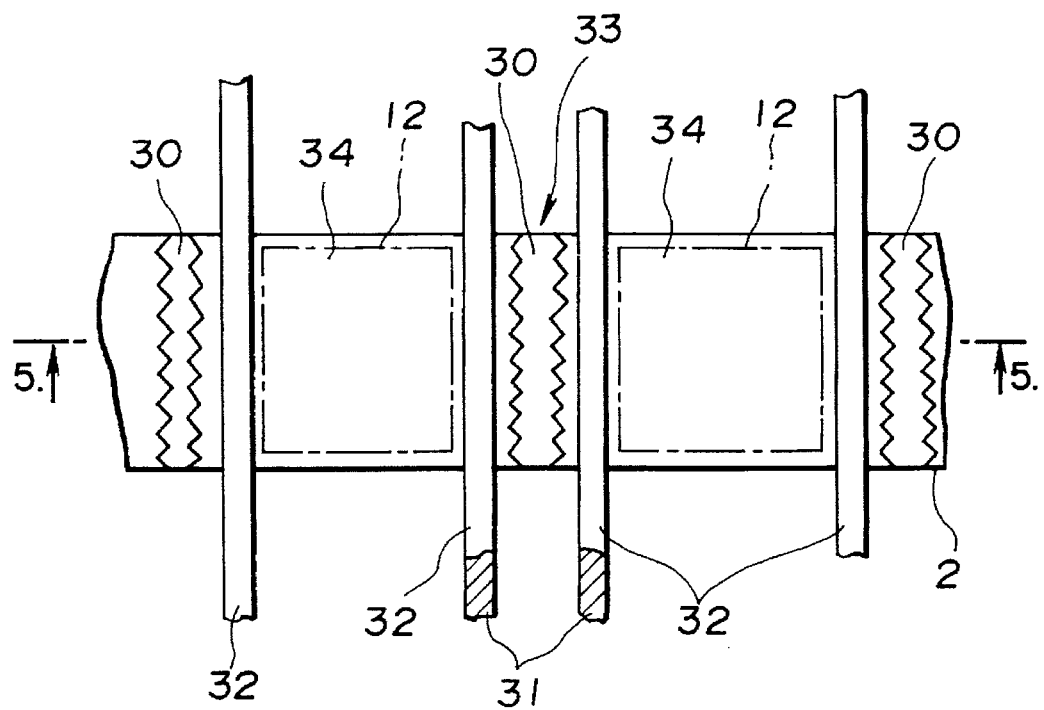
FIG. 6 is a plan view showing a front cover incorporated in the flat-type fluorescent display device shown in FIG. 5.
Figure 7:
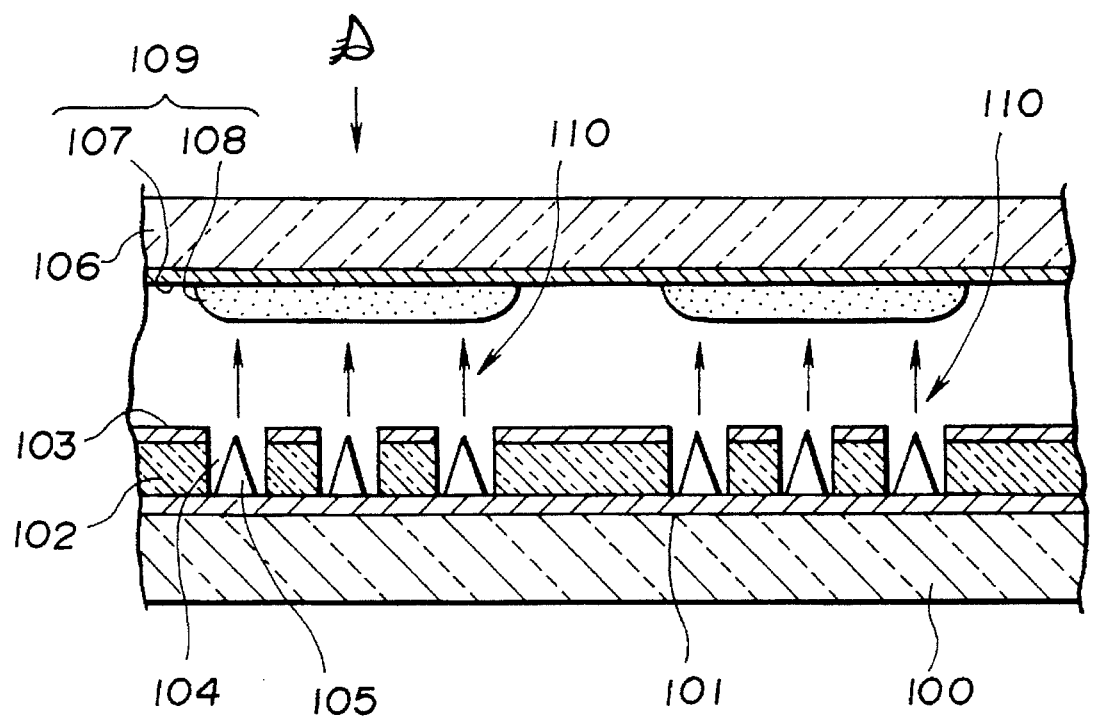
FIG. 7 is a sectional view showing a conventional flat-type fluorescent display device incorporating FECs therein.

FIGS. 5 and 6 show a further embodiment of a flat-type fluorescent display device according to the present invention. In each of the embodiments described above, the FECs each are formed into a spindt type including the emitter of a conical shape. A flat-type fluorescent display device of the illustrated embodiment incorporates planer type FECs therein.

More specifically, a front glass cover 1 is provided on an inner surface thereof with cathode lines 2, which are made of ITO and arranged so as to be spaced from each other at predetermined intervals. Then, the cathode lines 2 each are provided thereon with emitters 30 of a pectinate shape which is formed on both sides thereof in a longitudinal direction thereof with teeth. The emitters 30 each are so arranged that a row of teeth of the emitter 30 on each of both sides thereof in the longitudinal direction extends perpendicular to the longitudinal direction of the cathode line 2. Also, the flat-type fluorescent display device of the illustrated embodiment includes insulating layers 31 which are arranged so as to interpose the emitters 30 therebetween and extend beyond both sides of each of the cathode lines 2 in the longitudinal direction of the cathode line. The insulating layers 31 each are formed thereon with a gate line 32. Thus, in the illustrated embodiment, FECs 33 of the planar type are formed at predetermined intervals, so that light-permeable sections 34 are defined between the FECs 33.

Arranged opposite to the front glass cover 1 is a substrate 9, which is formed on portions thereof opposite to the light-permeable sections 34 with anodes 12. The remaining part of the illustrated embodiment may be constructed in substantially the same manner as the embodiments described above.

For driving of the fluorescent display device of the illustrated embodiment constructed as described above, selection of FECs 33 is carried out by the cathode lines 2 and gate lines 32 cooperating together to constitute a matrix. Anode lines 10 each may be fed with a signal in synchronism with the gate lines 32. Alternatively, the anode lines 10 may be constantly fed with a positive voltage through a common power supply. In this regard, the planar type FECs 33 permit the gate lines 32 to function to control a direction of traveling of electrons, like the deflecting electrodes 20 in the embodiment shown in FIG. 3A to 4, to thereby reduce a possibility that electrons undesirably impinge on adjacent anodes. Nevertheless, deflecting electrodes may be arranged on both sides of the gate lines and emitters so as to interpose both therebetween as in the embodiment described above with reference to FIGS. 3A to 4. In the illustrated embodiment as well, luminous display of the anodes 12 is observed through the light-permeable sections 34 of the front glass cover 1.

Each of the above-described embodiments may be so constructed that the insulating layers are made of a transparent or light-permeable material and the gate lines are made of a transparent or light-permeable material. Such construction permits the light-permeable sections to be further enlarged.

As can be seen from the foregoing, the flat-type fluorescent display device of the present invention is so constructed that the light-permeable sections are defined between FECs arranged on the inner surface of the front glass cover and the anodes are provided on the portions of the substrate opposite to the light-permeable sections. Such construction permits luminous display of the anodes to be observed through the light-permeable section of the front glass cover while permitting luminance to be increased to a level 1.4 to 2.0 times as much as that obtained by the conventional front emission type fluorescent display device.

Also, the present invention may incorporate the deflecting electrodes and/or the planar type FECs to substantially deflect electrons. This permits FECs to be arranged at positions substantially non-opposite to the anodes, to thereby enlarge the light-permeable sections, resulting in observation of luminous display of the anodes being further facilitated.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A fluorescent display device, comprising:
    a front transparent cover having an outer surface and an inner surface;
    a substrate having a substrate surface opposing said inner surface of said front transparent cover;
    a plurality of field emission elements for emitting electrons, said plurality of field emission elements disposed on said inner surface of said front transparent cover;
    a plurality of regions of phosphorescent material on said substrate, each of Said plurality of regions having an electron impingement surface facing the front transparent cover, said impingement surface for impingement by the electrons emitted by at least one of said plurality of field emission elements;
    wherein each of said plurality of said field emission elements is offset from each of said plurality of regions of phosphorescent material, relative to said substrate surface, such that each of said plurality of regions of phosphorescent material is visible when viewed from outside said outer surface; and
    whereby fluorescence propagating to said front transparent cover is generated by the impingement of the electrons on the electron impingement surface.

2. A flat-type fluorescent display device as defined in claim 1, wherein each of said field emission elements are Spindt type including an emitter having a conical shape.

3. The device according to claim 1, wherein said field emission elements comprise pointed emitters.

4. The device according to claims 1, further comprising an anode layer between each of said plurality of regions of phosphorescent material and said substrate surface.

5. The device according to claim 1, wherein said pointed emitters comprise Mo or Nb.

6. The device according to claim 1, wherein each of said plurality of field emission elements further comprises a gate line.

7. The device according to claim 1, further comprising:
    a plurality of anode lines, each of the plurality of anode lines is between at least one of the plurality of regions of phosphorescent material and said substrate surface; and
    a plurality of gate lines, each one of said plurality of field emission elements comprising part of one of said plurality of gate lines; and
    wherein said plurality of anode lines and said plurality of gate lines are all parallel to one another.

8. The device according to claim 1, further comprising a deflecting electrode for deflecting an electron beam generated by at least one of said plurality of field emission elements.

9. The device according to claim 1, further comprising cathode lines on said inner surface of said front transparent cover.

10. The device according to claim 9, wherein said cathode lines are transparent.

11. The device according to claim 1, further comprising means for deflecting electrons emitted from said field emission element toward said phosphorescent material.

12. The device according to claim 11, wherein said means for deflecting comprises field emission cathodes.

13. The device according to claim 1, wherein:

said front transparent cover has light permeable sections which are permeable to light generated by said phosphorescent material, and light nonpermeable section which are not permeable to light generated by said phosphorescent material, and area of said light permeable sections is greater than an area of said light non-permeable sections.

14. The device according to claim 13, wherein said plurality of field emission elements are in said light non-permeable sections and are not permeable to light.

* * * * *